United States Patent
Livingston et al.

(10) Patent No.: US 6,562,109 B2
(45) Date of Patent: May 13, 2003

(54) ACCELERATION ASSISTED PARTICLE/GAS SEPARATION SYSTEM

(75) Inventors: Darren Livingston, Denver, CO (US); Youfan Gu, Superior, CO (US); Paul Dozoretz, Thornton, CO (US); James M. Mueller, Lafayette, CO (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/821,713

(22) Filed: Mar. 28, 2001

(65) Prior Publication Data

US 2002/0139249 A1 Oct. 3, 2002

(51) Int. Cl.⁷ .............................. B01D 45/14; B01J 8/08
(52) U.S. Cl. ............................ 95/270; 55/438; 55/423; 422/212; 422/215; 422/187
(58) Field of Search ............................ 95/270; 55/437, 55/438, 406, 477, 423; 422/209, 210, 225, 187, 211, 212, 215

(56) References Cited

U.S. PATENT DOCUMENTS

| | | | |
|---|---|---|---|
| 2,199,015 A | * 4/1940 | Toensfeldt | 159/4.01 |
| 2,447,119 A | * 8/1948 | Goodyer | 55/438 |
| 3,483,980 A | 12/1969 | Cochran et al. | 210/131 |
| 4,506,513 A | 3/1985 | Max | 62/55.5 |
| 5,141,714 A | 8/1992 | Obuchi et al. | 422/174 |
| 5,536,298 A | * 7/1996 | Awaji | 55/329 |
| 5,776,216 A | 7/1998 | Yang | 55/385 |
| 5,855,651 A | 1/1999 | Kurita et al. | 95/280 |

FOREIGN PATENT DOCUMENTS

| | | | |
|---|---|---|---|
| DE | 3625006 A1 | * 4/1987 | |
| JP | 3229609 | 10/1991 | |
| JP | 4313315 A | * 11/1992 | 55/348 |

OTHER PUBLICATIONS

Brochure entitled "Foreline Traps", Nor–Cal Products, Nor–Cal Products, Inc., May 1990.

* cited by examiner

*Primary Examiner*—Robert A. Hopkins
(74) *Attorney, Agent, or Firm*—James R. Young; Faegre & Benson LLP

(57) ABSTRACT

Trap apparatus and method for removing contaminants from the gaseous effluent flows from chemical vapor deposition chambers and processes by flowing the particle laden gas into an upper chamber of the trap apparatus, imparting additional kinetic energy to the powder particles to enhance separation of the powder particles from the gas, and then flowing the gas, sans the powder particles, out of the trap, while the powder particles fall into and are captured by a lower chamber positioned below the upper chamber and remote from the flowing gas. An impeller positioned in the upper chamber in the inlet path imparts the additional kinetic energy. For some reaction gas systems, an optional reactor with hydrophillic, rotating growth substrates enhance and accelerate growth of solid particles, which are then dislodged from the media, and fed by the flowing gas into the upper chamber for capture as previously described.

90 Claims, 10 Drawing Sheets

ACCELERATION ASSISTED PARTICLE/GAS SEPARATION SYSTEM

BACKGROUND OF THE INVENTION

1. Field of the Invention

This invention is related to devices for agglomerating, capturing, and retaining solid particles from a gaseous flow, and more particularly to apparatus and methods for agglomerating, capturing, and retaining powders from gaseous effluent flows from chemical vapor deposition chambers and processes.

2. State of the Prior Art

Semiconductor devices are often manufactured by processes that include depositing thin, solid films of semiconductor, conductor, and dielectric materials onto substrates by reacting one or more precursor chemicals in a reaction chamber in a manner that produces and deposits or grows the desired solid state thin film material on the substrate. Many of such chemical vapor deposition (CVD) processes are conducted in a vacuum, and many are conducted in ambient, i.e., atmospheric, pressure. However, regardless of the pressure conditions, it is critical in CVD processes to maintain the precursor chemicals in precise proportions to each other and to exclude contaminants in order to obtain the uniformity, morphology, and quality of deposited material necessary to meet semiconductor device quality specifications and performance criteria. To do so, it is typical in CVD processes to flow the constituent precursor gases in the proper proportions into and through the reaction chamber in much larger quantities than is expected to be reacted and deposited on the substrate, and it is typical to mix such constituent precursor gases with much larger quantities of a carrier gas and flowing the mixture through the reaction chamber. Inert carrier gases, which do not enter into the reactions, are often used to dilute precursor gases flowing through the reaction chambers to enhance proper proportioning and mixing of the precursors or to carry by-products of the reactions out of the reaction chambers before such by-products contaminate the films being deposited. Typically, significantly more amounts of carrier gases are used in CVD processes that operate at or near ambient pressure than those that operate in evacuated systems. However, in both vacuum deposition chambers and ambient deposition chambers, the flow of precursor gases with or without carrier gases through the reaction chamber is assisted by a gas pump or fan blower positioned downstream of the reaction chamber. The pump or blower is generally called a vacuum pump in evacuated CVD systems and fans or blowers in atmospheric pressure systems. The pump or blower is typically connected to the reaction chamber with a pipe, often called a foreline, which conducts effluent gases from the reaction chamber to the pump or blower. From the pump or blower, the effluent gases from the CVD process are directed to appropriate treatment, recovery, or disposal apparatus, depending on the toxicity, value, or other characteristics of the effluent gases.

In addition to the deposited thin films on substrates, by-products are often formed by the chemical reactions of the precursors in the CVD reaction chambers, and many of such by-products are unwanted. In many cases, powdery by-products are produced in CVD reaction chambers, which are not helpful and can be harmful. For example, in CVD processes that deposit thin films of silicon dioxide ($SO_2$) on substrates, there is a substantial amount of silicon dioxide powder produced in the reaction chamber, too. Excessive gas-phase chemical reactions often lead to generation of more powdery by-products, which is especially prevalent for atmospheric pressure chemical vapor deposition (APCVD) and sub-atmospheric chemical vapor deposition (SACVD) precesses. To keep such powder particles from contaminating and adversely affecting the quality of the silicon dioxide thin films being deposited on the substrates, it is important to maintain a sufficiently large flow rate of carrier gas flowing through the CVD reaction chamber to sweep such powders along with the CVD reaction by-products out of the reaction chamber, which, as mentioned above, is the function of the pump or blower. However, silicon dioxide is a hard, crystalline substance similar to glass and can cause severe wear and damage to internal parts of pumps and blowers. It is not unusual for pumps and blowers, cost in the range of $30,000 to $50,000, to be rendered useless by such wear in only a few weeks of operation, thereby requiring replacement. In such circumstances, the cost of the pump or blower is itself sufficient reason for finding solutions, but the costs of idling an entire system while repairing or replacing a pump or blower is even more substantial—often in the range of $5,000 to $8,000 per hour. In other CVD processes, powders of boron oxide ($B_2O_3$), and phosphorous pentoxide ($P_2O_3$) cause similar problems, and there are many others.

Removal of solid particulates, including powders, from gaseous flows is not a new problem, and there are many known methods and apparatus for doing so. For example, porous filter elements or membranes in which the gas, but not the solid particles, flows through the pores are common. However, to achieve the particle removal efficiency that is required to protect pumps, blowers, and other downstream components in APCVD and SACVD systems, filter media with small pore sizes are often used. Unfortunately, such small pore sizes also lower trapping capacity due to rapid clogging of the small pores. Cyclone structures are also very common for separating solid particulates from gas flows on a continuous basis with no clogging problems. In a cyclone, the gas flow stream laden with particulate matter is directed circumferentially into the top of an inverted conical chamber, where it is forced into a spiral flow pattern. Since the solid particles have more mass than the gas molecules and are more dense than the gas, the particles have more momentum (mass×velocity) and inertia than the gas. Therefore, the centrifugal force of the particles in the spiral flow is greater than the centrifugal force of the gas molecules, which forces the particles to the conical chamber sidewall as the gas stream is drawn away from the sidewall to a gas outlet. As the particulate matter loses its kinetic energy during the spiral flow in the cyclone, it moves downwardly in the inverted conical chamber. However, the decreasing diameter of the inverted conical chamber, in combination with the principle of conservation of momentum, increases angular velocity of the particles and maintains the centrifugal force that separates the particles from the gas flow until the particles eventually drop out an opening in the bottom of the inverted conical chamber as the gas flow exits from a hole in the top of the conical chamber. However, such cyclone separators do not work well in forelines of CVD reaction chambers, because the gas flow rates from APCVD systems (approximately 300 SLM) and LPCVD systems (approximately 0.2 SLM are too low to achieve optimal operation of a cyclone particle separation device and the particles generated inside APCVD and SACVD reaction chambers are often too fine to be separated from gas efficiently in cyclone separators. In CVD chambers operating under a substantial vacuum, the pressure is so low that it is not possible for the gas flow to impart enough kinetic energy or momentum to the particulate matter to create an effective cyclone flow.

SUMMARY OF THE INVENTION

Accordingly, it is a general object of the present invention to provide an improved apparatus and method for trapping and removing particulate matter, especially powders, from gaseous effluent of CVD reaction chambers.

Another object of the invention is to provide an improved apparatus and method for accelerating particle formation in certain kinds of gas effluents from reaction chambers, such as TEOS, to increase efficiency of particle/gas separation.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, the method of the present invention may comprise, but is not limited to, flowing the particle laden gas into an upper chamber and, in the upper chamber, imparting additional kinetic energy to the powder particles to enhance separation of the powder particles from the gas and then flowing the gas, sans the powder particles, out of the trap, while allowing the powder particles to fall into a lower chamber positioned below the upper chamber and remote from the flowing gas. For some reaction gas systems, such as TEOS used for depositing silicon doixide ($SiO_2$) films, an optional reactor with hydrophillic, rotating growth substrates enhance and accelerate growth of solid particles, which are then dislodged from the media, and fed by the flowing gas into the upper chamber for capture as described above.

To further achieve the foregoing and other objects, and in accordance with the purposes of the present invention, the apparatus of the invention may comprise, but is not limited to, a housing that encloses the upper chamber and the lower chamber with the impeller mounted rotatably in the upper chamber. For higher pressure systems, a chute is provided under the impeller to separate the upper chamber from the lower chamber and to direct powder particles separated from the gas to an opening at the bottom of the chute into the lower chamber, and the inlet for the powder laden gas into the upper chamber is preferably positioned above the impeller while the outlet opening for gas stripped of the power particles is preferably positioned in the upper chamber above the opening at the bottom of the chute. The outlet opening can be wide and near the bottom of the chute for lower mass flow rates and may need to be positioned higher and perhaps be smaller for effective particle separation from the gas in higher mass flow rate applications. Other outlet configurations, such as multiple smaller openings, flanges, and the like, to obtain optimum separation in a particular application. An optional reactor positioned upstream from the inlet opening of the upper chamber include multiple, elongated, flexible, resilient growth substrates extending radially outward from a rotating shaft and a cleaning rod positioned in the rotational path of the substrates. For low pressure systems, a cowl is positioned around the periphery of the impeller to provide an impact and deflection surface to induce powder particles separated from the gas to fall into the lower chamber, and the inlet for the powder-laden gas is preferably positioned below the impeller and aligned radially inward from the periphery of the impeller while the outlet opening for gas stripped of the powder particles is preferably positioned above the impeller. For both higher pressure systems and lower pressure systems, the impeller is preferably driven by a motor positioned outside of the upper chamber via a magnetic coupling between the motor and the impeller.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings.

DETAILED DESCRIPTION OF THE PREFERRED EMBODIMENTS

Figure 1:
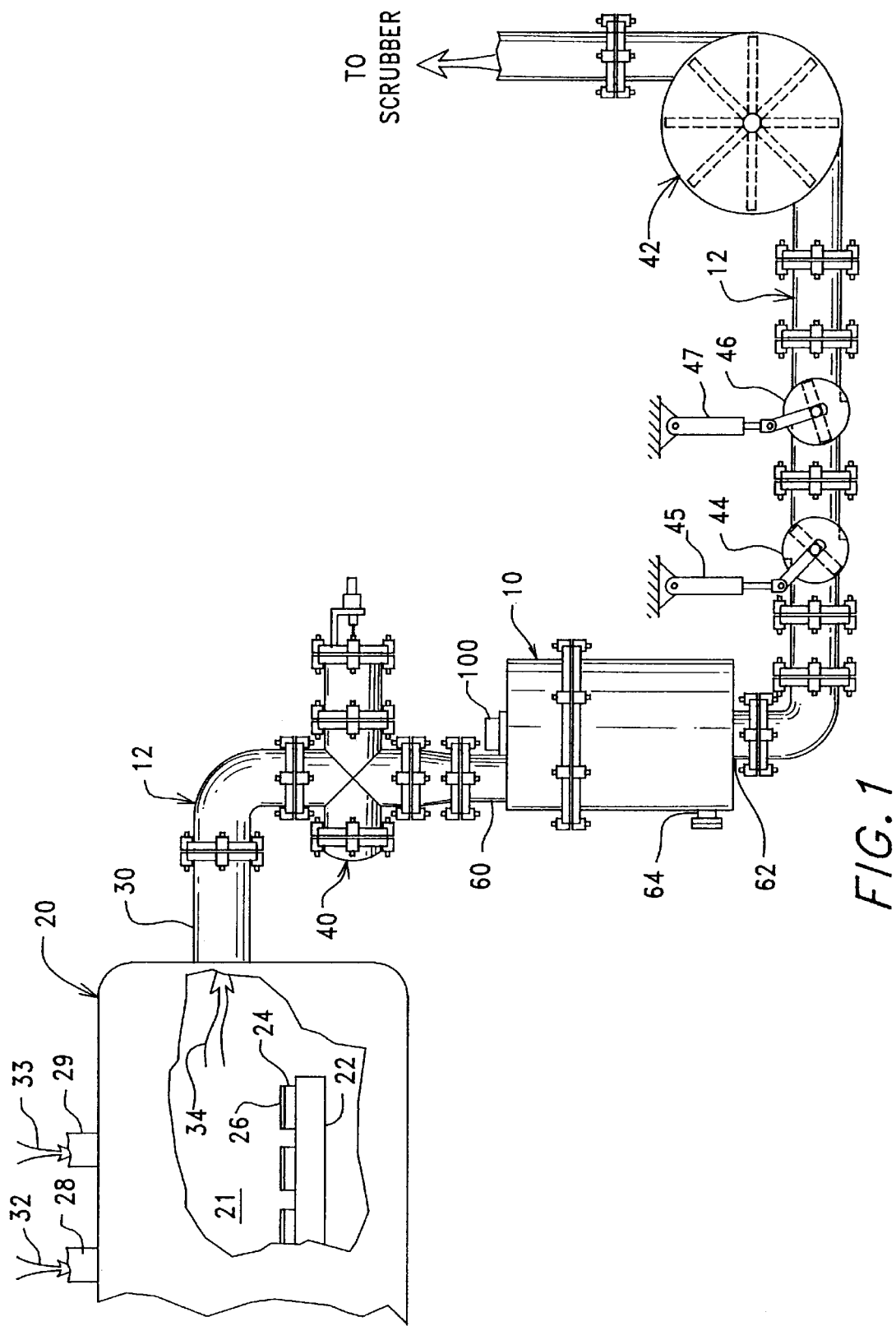
FIG. 1 is a diagrammatic view of the acceleration assisted particle/gas separation apparatus of the present invention, including the optional rotating substrate reactor, mounted in a foreline of a CVD reaction chamber deposition system and configured for ambient atmospheric pressure operation of the CVD deposition system.

The acceleration assisted particle/gas separation apparatus 10 of the present invention configured for operation in a system with an ambient chemical vapor deposition (CVD) chamber 20 operated at about ambient atmospheric pressure is shown in FIG. 1 mounted in the foreline 12 of a typical CVD chamber. The acceleration assisted particle/gas separation apparatus 10 is sometimes referred to herein as the "spin particle trap", "spin trap", or merely as the "trap" for short. In general for a CVD process operated at about ambient or atmospheric pressure (APCVD), a inert carrier gas mixed with the precursor chemical gases is fed into the reaction chamber 20 via one or more inlet openings 28, as indicated diagrammatically by flow arrow 32. One or more additional precursor chemical species may be fed into the chamber 20 concurrently, via another inlet opening 29, as indicated diagrammatically by the flow arrow 33. The chamber is usually heated to assist the chemical reactions, depending on the parameters and criteria of the particular deposition process being conducted. The precursor chemicals react in interior 21 of the chamber 20 to produce a desired material that deposits on the substrates 24, which are supported by a wafer chuck 22 in the chamber 20, to form a solid state film 26 on the substrates 24. The carrier gas along with the unreacted precursor gases and the gaseous by-products of the reaction are drawn out of the chamber 20 via an outlet 30 and through a foreline by a pump or fan blower 42 for recycling or disposal. One or more throttle valves 44, 46 are often provided upstream from the blower fan 42 to maintain constant desired pressure in the reaction chamber 20. Such throttle valves 44, 46 are usually butterfly-type valves and can be operated or adjusted by some kind of actuators 45, 47. In APCVD systems, the spin particle trap 10 of this invention is preferably positioned in the foreline 12 upstream from the throttle valve(s) 44, 46, as shown in FIG. 1.

Because reactive chemical precursors are used in the CVD processes and significant quantities of such precursors are swept along with the carrier gas out of the reaction chamber 20 and into the foreline 12, the chemical reactions can occur even inside the foreline 12 outside of the reaction chamber 12. For example, but not for limitation, tetraethylorthosilicate or tetraethoxysilane gas $(Si(OC_2H_5)_4)$, also known as TEOS, which is often used as a precursor to deposit silicon dioxide thin films, gets swept into the foreline 12, where it polymerizes slowly on the inside surfaces of the foreline 12. Essentially, the TEOS gas reacts with water, which is a by-product of the chemical reaction in the CVD process in chamber 20 that also gets swept into the foreline 12 or might be introduced into the system in other ways. A reactor 40 can also be installed in the foreline 12 upstream from the trap 10 according to this invention to induce TEOS polymerization onto particles to agglomerate particulates or powders so that they can be removed from the effluent gas stream by the trap 10 more efficiently, as will be described in more detail below.

Figure 2:
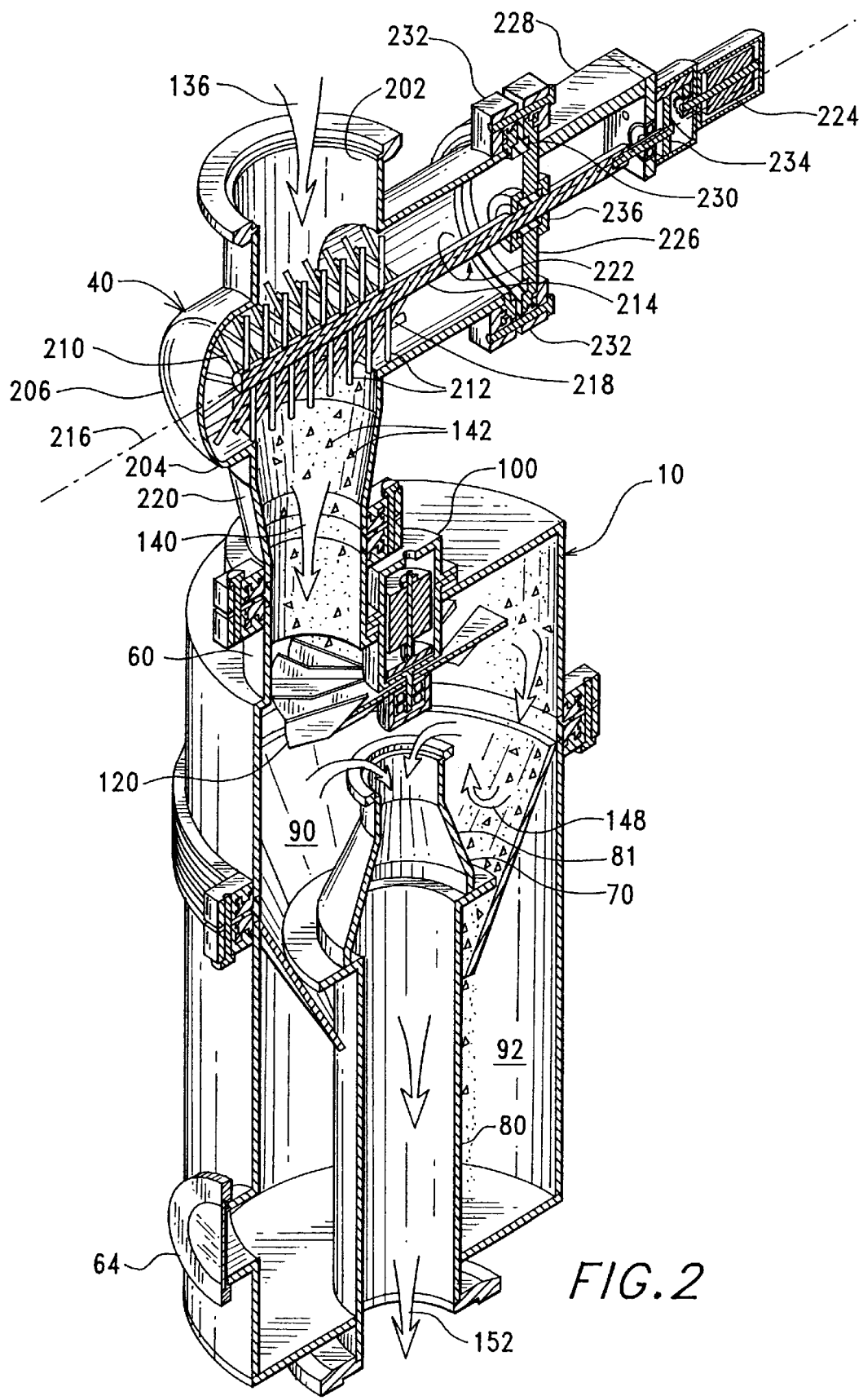
FIG. 2 is an isometric, cross-sectioned view of the acceleration assisted particle/gas separation apparatus, including the optional rotating substrate reactor, of the present invention.

Referring now primarily to FIG. 2, the flow 136 of effluent carrier and unreacted precursor gases and byproducts (e.g., TEOS and water) enters the reactor 40 through its inlet 202 and flows into its reactor cavity 204, which is enclosed by a reactor housing 206. A reactor rotor 210, which resembles a round brush, comprises a plurality of narrow, elongated, flexible, resilient substrate bristles 212 extending radially outward from a reactor shaft 214 and is positioned in the reactor cavity 204 transversely across the gas flow path 136 to rotate about a rotor axis 216. The substrate bristles 214 also preferably comprise a hydrophillic material, such as nylon, to adsorb and retain water from the gas flow 136. TEOS reacts with the water to polymerize into solid silicon dioxide, but the reaction occurs slowly. However, the probability of reaction between the water and TEOS can be enhanced significantly by the water being adsorbed and retained on substrate surfaces, such as is provided by the bristles 212, and the reaction continues until the water is consumed. To prevent excessive accumulation of solid TEOS polymer on the bristles 212, the rotor 210 is rotated so that its bristles 212 are wiped over an obstacle, such as the stationary, elongated rod 218, which extends through the cavity 204. As each bristle 212 is wiped over the rod 218, it flexes backwardly until its distal end is dragged over the rod 218. Upon clearing the rod 218, the resilient bristle 212 then snaps forward to its original shape. The wiping back and snapping forward action of the interaction of the bristles 212 with the rod 218 dislodges TEOS polymer particles 220 from the bristles 212. The dislodged particles 142 are then carried by the gas flow 140 into the spin particle trap 10, where the particles 142 are separated from the gas flow 148 in the upper chamber 90 and collected in the lower chamber 92 as the gas flow 152 continues out of the trap 10, as will be described in more detail below. The reactor rotor 210 is rotated, as indicated by arrow 222, by a motor 224 mounted on an end plate 226 of the reactor housing 206 with a bracket 228. The end plate 226 with a seal 230 is mounted on the reactor housing 206 by clamps 232. A reduction gear box 234 is provided to reduce the speed of the motor 224 to a suitable speed for th reactor rotor 210, preferably in a range of about 5 to 30 revolutions per minute (RPM) for the TEOS example described above. A suitably sealed rotary feed-through journal 236 is provided in end plate 226 to support the rotor shaft 214. Other similar rotating structures with wiping surfaces can also be used for reactor 40. For example, instead of bristles, other substrates, such as pads, straps, and the like can be used. Also, instead of a stationary rod, any other wiping structure, even a second rotor interfacing with the first rotor, can be used to dislodge the solid particles from the substrate surfaces.

The spin particle trap 10 operates more efficiently when the particles 142 that have to be separated from the gas flow are larger. Therefore, the agglomerated particles 142 produced by the reactor 40 enhance the particle separation efficiency of the trap 10. However, many CVD processes produce powders in the foreline 12 with particles that are very small. Such small powder particles in general, as well as the agglomerated particles 142 produced by the reactor 40 in particular, are too small for normal separation processes and apparatus. Therefore, the spin particle trap 10 of the present invention is provided to improve trapping efficiency and effectiveness for powders and other fine particles in effluent gas flows from CVD reaction chambers 20.

Figure 3:
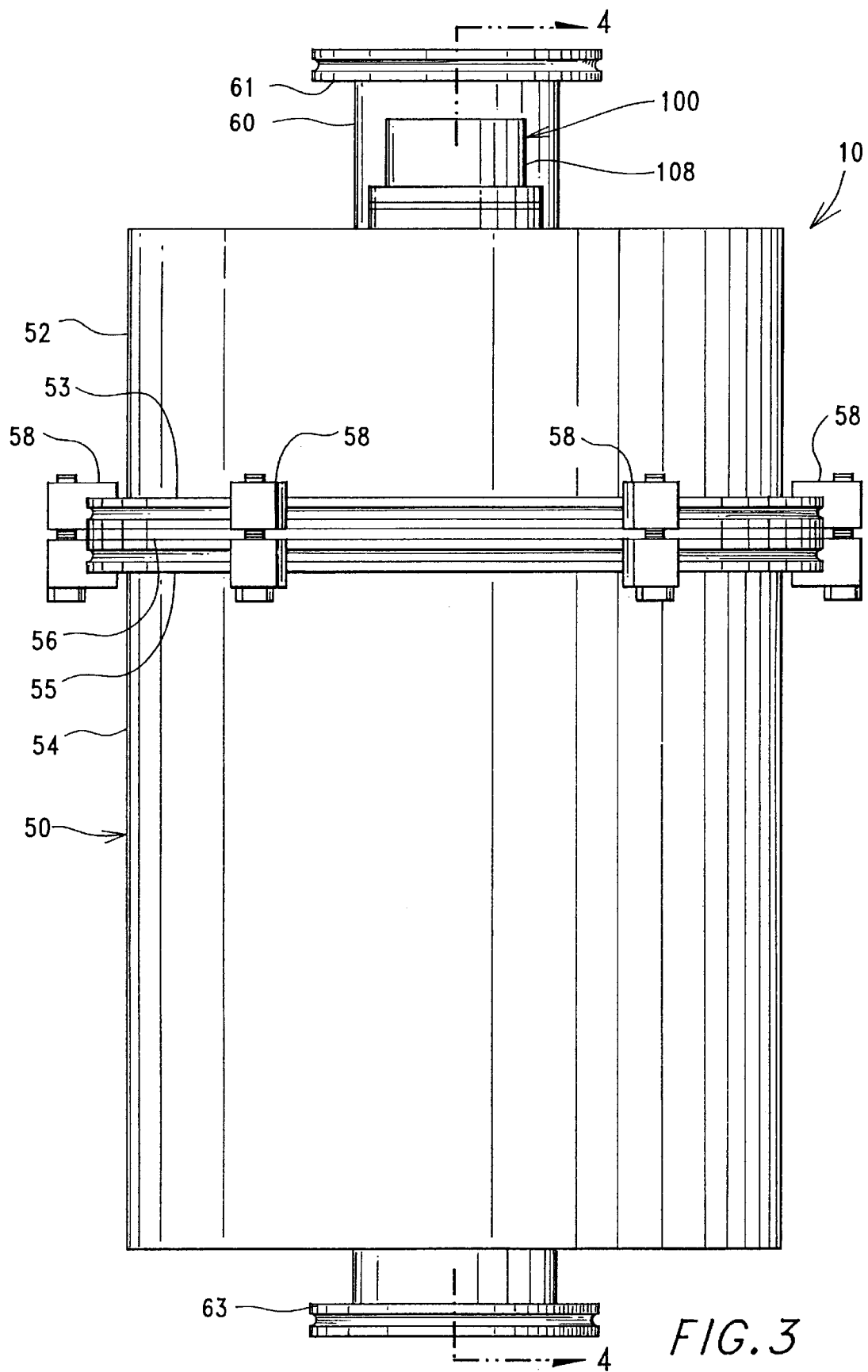
FIG. 3 is a right side elevation view of the acceleration assisted particle/gas separation apparatus shown in FIG. 1.
Figure 4:
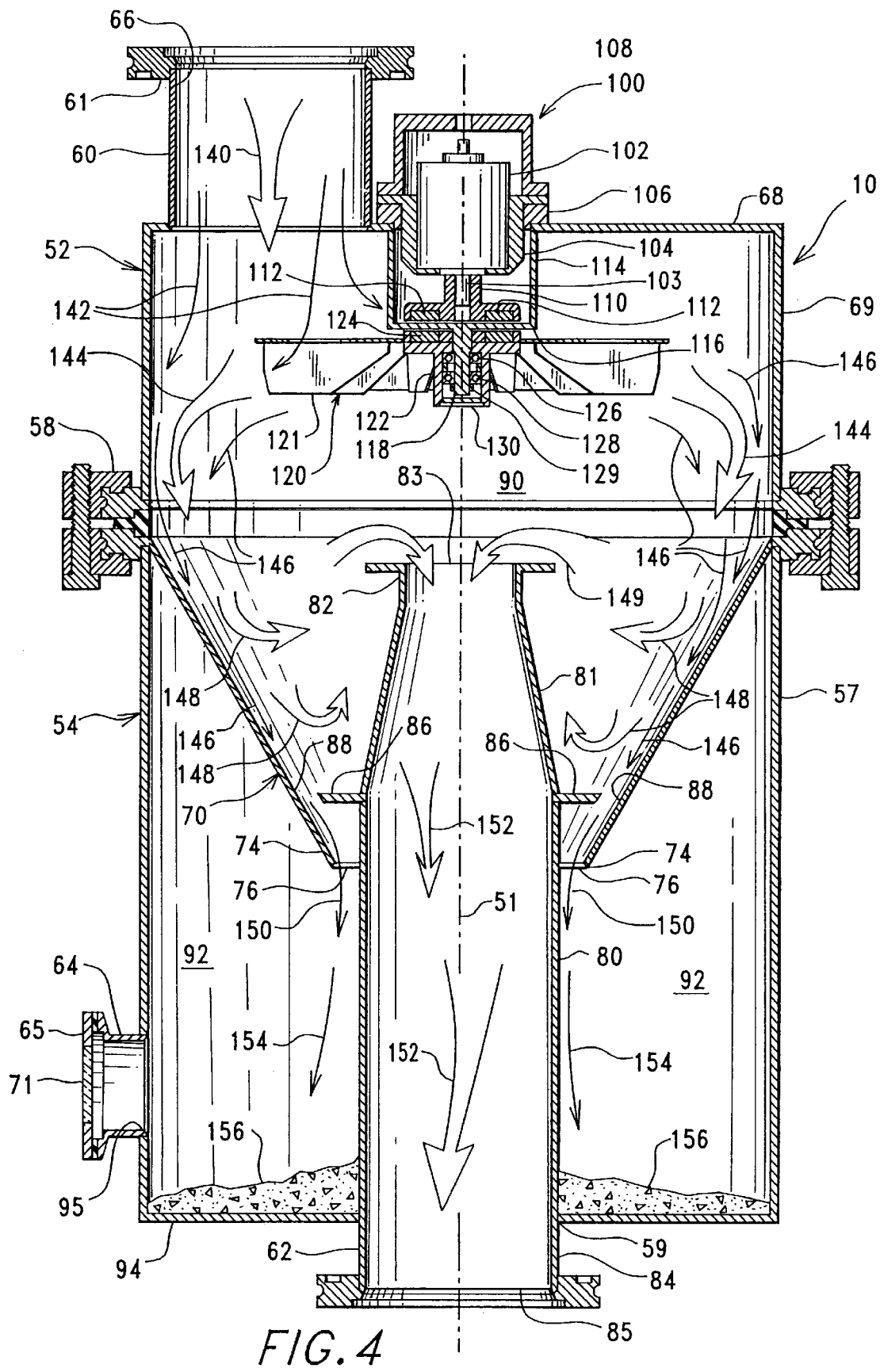
FIG. 4 is a cross-section view of the acceleration assisted particle/gas separation apparatus and shown with an outlet that is configured for operating in a high mass flow rate of effluent gas from a CVD system operated at ambient atmospheric pressure of this invention taken along section line 4—4 of FIG. 3.

With reference now primarily to FIG. 4, but with continuing secondary references to FIGS. 1–3, the powder laden gaseous flow with kinetic energy imparted by the suction of the pump or fan blower 42 connected to the foreline 12 downstream from the trap 10, as described above, enters the trap 10 through the inlet tube 60, as indicated by gaseous flow arrow 140. The inlet tube 60 extends between an inlet opening 66 at its upper end to an inlet opening 67 in the top panel 68 of the housing 50. The housing 50 encloses an interior space that is divided by a conical chute 70 into an upper chamber 90 and a lower chamber 92. In ambient atmospheric pressure systems as well as in systems that operate at higher than atmospheric pressure, there is enough mass of gas as compared to mass of powder in the gas stream so that mass flow is dominated by the gas, not by the powder particles. To initiate the process of separating the powder particles from the gas stream, so that the powder particles can be captured and retained in the trap 10, spin assembly 100 includes an impeller 120, which spins and imparts radially outward directed momentum, thus added kinetic energy, to the powder laden gas flow 140 that enters the upper chamber 90 of the housing 50 through the inlet opening 67, thereby accelerating the gas stream flow radially outward, as indicated by the particulate flow arrows 142, 146 and by the gas flow arrows 144, and the additional kinetic energy in the circular housing 69 imposes a spiral flow 144 of the gas around the upper chamber 90. Since the particles have higher greater mass and higher density than the gas molecules, the particles will gain more momentum (mass×velocity) than the gas molecules. According to well-known physical principles, it is more difficult for an object with higher momentum to change its trajectory. Therefore, the higher density particles 146 will stay closer to the conical chute 70 than the gas flow 148, and eventually, the particles drop out of the conical chute 70 to be collected in the lower chamber 92 of the trap 10. Also, due to the conservation of momentum as the particles 146 spiral downwardly in the conical chute 70, the centrifugal force of the particles to hold them close to the chute 70 is maintained, despite loss of kinetic energy, because of the decreasing radius of the conical chute 70 toward its bottom, i.e., the cyclone effect, which is enhanced for fine powder particles by the additional kinetic energy imparted by the impeller 120. The outwardly accelerated gas flow 144 carries the powder particle flow 146 along with it radially outwardly to the sidewall 69 and the conical chute 70. However, the gas flow 152 out of the trap 10 only has the same level of kinetic energy as the gas flow 140 entering the trap 10, i.e., that imparted by the pump or fan blower 42 (FIG. 1). Therefore, the kinetic energy of the gas flow 148 in the conical chute 70 decreases toward the kinetic energy level of the influent gas flow 140 and effluent gas flow 152 as it converges radially inward to the outlet opening 83 of the effluent tube 80. At the same time the powder particles retain at least some of the additional kinetic energy that was imparted by the impeller 120 as the powder particles flow down the conical chute 70. Therefore, the powder particles separate from the gas flow 148, as indicated by particle flow arrows 150, as the gas flow 148 in the upper chamber 90 is diverted into the vertical tube 80 when so separated from the gas flow 148, the powder particulates drop through the opening 76 at the bottom 74 of the conical chute 70 and into the lower chamber or dust bin 92, as indicated by powder flow arrows 154 to the powder or dust heap 156 collecting on the bottom end panel 94 of the housing 50. A cleaning outlet 64 with a bung 65 and sight glass 71 connected into a bunghole 95 in the sidewall 57 can be used to clean powder 156 out of the bottom chamber 92 of the trap 10, as necessary.

The housing 50 can be formed and fabricated in any number of configurations, as persons skilled in the art would understand once they understand the principles of this invention. However, in the exemplary embodiment of the spin particle trap 10 illustrated in FIGS. 2 and 4, the housing 50 is shown with a cylindrical shape comprised of an upper housing portion 52 fastened together with a lower housing portion 54 by clamps 58 secured onto flanges 53, 55 on the respective upper and lower housing portions 52, 54. A suitable seal ring 56 is sandwiched between the flanges 53, 55 to maintain a seal between the interior and the exterior of the housing 50. Appropriate flanges 61, 63 on the inlet tube 60 and outlet tube 62, respectively, can provide attachment to either the CVD deposition system foreline 12 (FIG. 1), as is common in the industry, or to the reactor 40 of this invention, as explained above.

The upper rim 72 of the conical chute 70 fits tightly against the inside surface of the cylindrical sidewall 57 of the lower portion 54 of housing 50 and tapers radially inward and downwardly toward, but not all the way to, the axial center 51 of the cylindrical housing 50. Before reaching the axial center 51, the conical chute 70 is truncated to leave an opening 76 at its bottom end 74. The outlet tube 80 extends preferably from its outlet opening 83 at its upper end 82 in the upper chamber 90 downwardly through the opening 76 of chute 70, through the lower chamber 92, and through hole 59 in the bottom end panel 94 to the exterior of the housing 50. The vertical outlet tube 80 is smaller in diameter than the opening 76 at the bottom of chute 70, so it leaves the annular opening 76 extending radially outward around the periphery of the tube 80. The powder particles 150 drop from the upper chamber 90 through the annular opening 76 into the lower chamber 92, as explained above. An optional baffle 86 extends radially outward from the outlet tube 80 toward, but not all the way to, the inside surface of the conical chute 70, leaving an annular opening 88 between the baffle 86 and the inside surface of the conical chute 70 to enhance separation of the gas flow 148 from the powder flow 150, if desired.

For higher mass flow rates of gas flow through the trap 10, it is preferable to extend the outlet tube 80 upwardly some distance from the bottom opening 76 of the chute 70 and to converge it inwardly to a smaller diameter outlet opening 83, as illustrated by the frustoconical extension 81. A balance has to be found between the ideal of having the outlet opening 83 as close to the center axis 51 of the upper chamber 90 as feasible, while not choking the gas flow 149 so much as to either interfere with the desired operating pressure of the reaction chamber 20 (FIG. 1) or increase gas flow 149 velocity enough near the opening 83 to carry particles along with it into the outlet tube 80 and thereby defeat the particle/gas separation function of the trap 10. A second flange 87 extending radially outward from the outlet opening can enhance this separation function.

In the embodiment illustrated in FIGS. 2–4, the foreline 12 is depicted as four inches in diameter, which is a common industry size, and the connector piece 220 from the reactor housing 206 to the inlet 60 of the trap 10 is swaged from four inches down to three inches in diameter to match the three inches diameter of the inlet 60. The outlet opening 83 is illustrated as two inches in diameter, and the upper extension 81 is swaged up to a three-inch diameter outlet tube 80. The remainder of the foreline 12 downstream from the trap 10, as illustrated in FIG. 1, may continue with three-inch diameter components, or, it could be swaged back up to four inches in diameter, for example, if an existing system is retrofitted with the trap 10. Of course, the trap 10 and/or the reactor 40 could also be made with four-inch diameter inlets and outlets or any other convenient sizes, as the above description and accompanying drawings are provided as enabling, but not limiting examples.

A significant feature of the powder trap of this invention is the magnetic spin impeller unit 100, which imparts a radially outward momentum to the powder laden gas flow 140 entering the upper chamber 90, as described above, but with the motor 102 positioned outside of the chamber 90 and with no drive shaft 103 or other parts of the motor 102 extending through a partition into the chamber 90. Therefore, no seals that can accommodate rotating shafts are needed. The impeller 120, comprising a plurality of vanes 121 extending radially outward from a hub 122 is mounted rotatably on a spindle 118 that extends axially downward from a cylindrical well casing 114. The impeller hub 122 is journaled on the spindle 118 by two ball bearings 126, 128 and held in place by a retainer ring 129. A motor 102, preferably electric or pneumatic, spins a rotor 110 in the well, which is defined by the well casing 114, immediately adjacent the end plate 116 of the well casing 114. A plurality of master magnets 112 are mounted in the rotor 110. A plurality of slave magnets 124 are mounted in the impeller hub 122 in juxtaposition to the master magnets 112, but on opposite sides of the end plate 116. Therefore, when the motor 102 spins the rotor 110 with the master magnets 112 on one side of the end plate 116, the magnetic forces of the spinning master magnets 112 will cause the slave magnets 124 juxtaposed on the opposite side of the end plate 116 to spin the impeller 120 in the upper chamber 90.

It is a preferred, but not essential, feature of this invention to have six master magnets 112 mounted in equal, angular-spaced relation on the rotor 110 and three slave magnets 124 mounted in equal, angular-spaced relation on the impeller 120. This arrangement minimizes any tendency for the slave magnets 124 and impeller 120 to lag behind and lose the magnetic coupling with the rotor 110. Also, it is preferred that the motor 102 has insufficient torque to overcome the magnetic coupling force between the master magnets 112 of the rotor 110 and the slave magnets 124 of the impeller. Therefore, if there is enough of a load on the impeller 120 to slow the angular velocity of the impeller 120, it will also slow the angular velocity of the motor 102, instead of driving the rotor 110 at a higher angular velocity than the impeller 102. This feature also minimizes likelihood of decoupling the magnetic drive forces between the rotor 110 an and the impeller 120.

There are, of course, many ways to mount the motor 102 and rotor 110. In the exemplary embodiment shown in FIG. 3, the motor 102 is suspended through an aperture 105 in the top end panel 68 into the well defined by the cylindrical casing 114 by a cradle 104 mounted over a seal 106 on the top end panel 68, so that the drive shaft 103 of the motor 102 extends downwardly toward the end plate 116. The rotor 110 is mounted on the drive shaft 103 of the motor 102 so that it is suspended just above the end plate 116 to spin in that position, as explained above. A dust cap 108 covers the exterior of the motor 102.

As explained above, when the CVD reaction chamber 20 is being operated at ambient or higher pressure, the mass flow of the CVD reaction effluent 140 entering the trap 10 is dominated by the gas and not the powder particles. The impeller 120 imparts a radially outward directed momentum and increased velocity, thus increased kinetic energy of both the powder particles 146 and the gas 144. However, when the gas flow 148 is drawn back inwardly toward the axial center of the upper chamber 90 by the outlet opening 83 of the outlet tube 80, the gas flow velocity decreases and it loses kinetic energy. However the additional kinetic energy of the powder particles imparted by the impeller 120, including the centrifugal force on the particles by the spiral flow, prevents them from flowing with the gas flow 148 toward the opening 83 of the tube 80, and they thereby separate from the gas stream 148, as explained above. The conical chute 70 also tends to minimize turbulence in the upper chamber 90 and guides the gas flow 148 and the powder particle flow 146, 150 more gently toward the respective opening 83 for the gas flow 148 and opening 76 for the powder particle flow 150, whereas turbulence would remix the powder particle flow with the gas flow and defeat the function of the trap structure and function. The decreasing radius of the spiral flow 146 of the particles imposed by the conical chute 70 also maintains the centrifugal force on the particles, as explained above.

Figure 5:
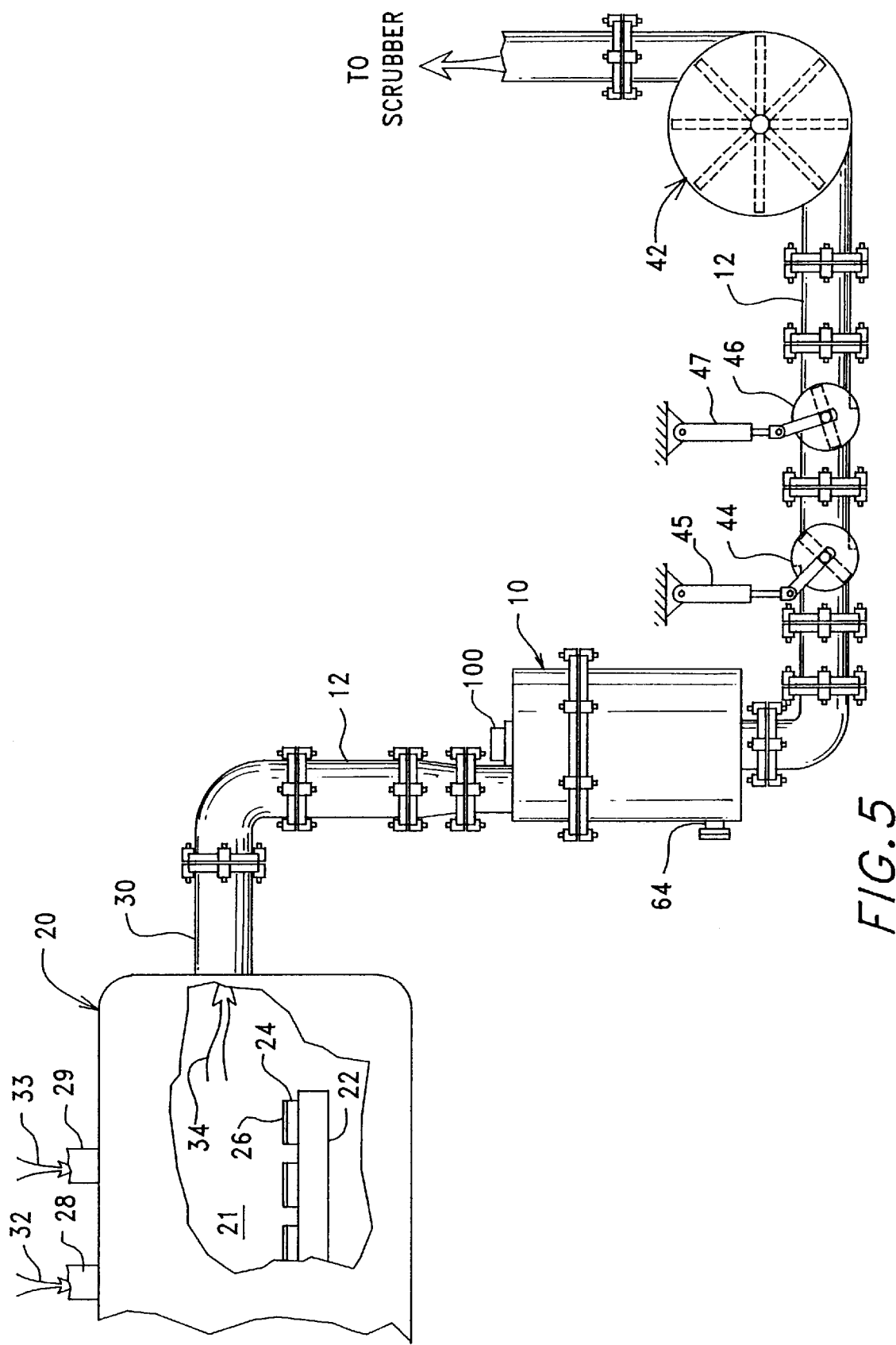
FIG. 5 is a diagrammatic view of the acceleration assisted particle/gas separation apparatus of the present invention mounted in a foreline of a CVD reaction chamber deposition system and configured for ambient atmospheric pressure operation of the CVD deposition system similar to FIG. 1, but without the optional rotating substrate reactor.
Figure 6:
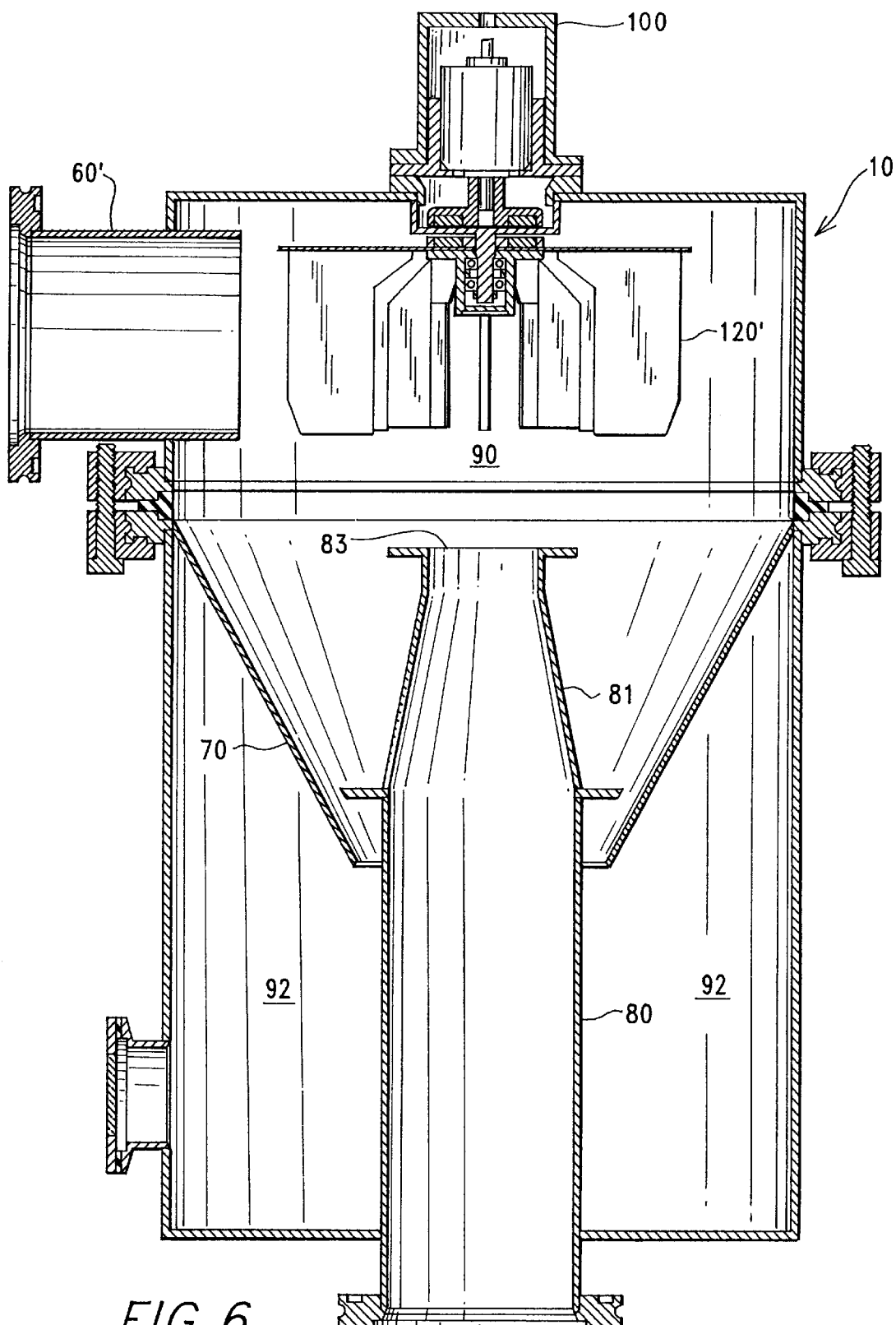
FIG. 6 is a cross-section view of a variation of the acceleration assisted particle/gas separation apparatus of this invention modified for a side inlet opening.

In APCVD systems that use chemical precursors or have powder by-products for which a reactor upstream from the trap 10 does not enhance particle agglomeration or separation efficiency, the trap 10 can be mounted by itself in the foreline 12 upstream from the throttle valve(s) 44, 46, as shown in FIG. 5. Also, while it is preferred to have the inlet 64 in the top of the trap 10, as shown in FIGS. 2–4, especially when a reactor 40 is used, a side inlet 60', as illustrated in FIG. 6, positioned radially outward from the impeller 120' could also be used.

Figure 7:
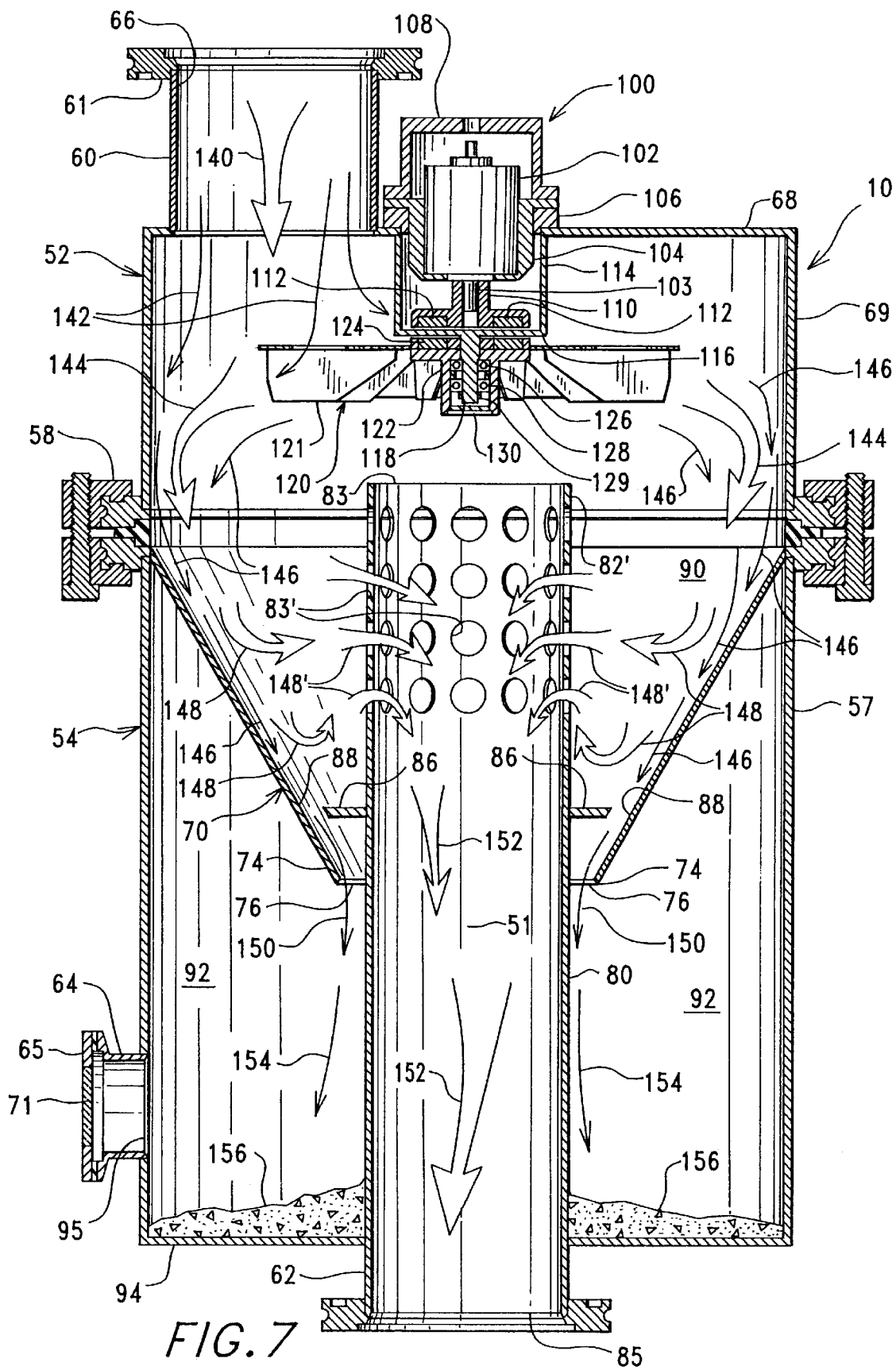
FIG. 7 is a cross-section view of a variation of the acceleration assisted particle/gas separation apparatus of this invention and shown with an outlet that is configured for operating in moderate to high mass flow rates of effluent gas from CVD systems operated at ambient atmospheric pressure.

While the structure shown in FIGS. 2 and 4 and described above has been found to be effective in separating the powder particles from high mass flow rates of gas flow through the trap 10, moderate to high mass flow rates can also be by other outlet tube 80 configurations, for example, as illustrated in FIG. 7. In this structural variation, the upper end 82' of the outlet tube 80 can, but does not have to, include a plurality of outlet ports 83' in the portion of the outlet tube 80 that extends into the portion of the upper chamber 90 that is in the conical chute 70. This configuration distributes the gas flow 148' into the outlet tube 80 over a larger area. Such distribution over a larger area minimizes high-velocity streams of gas flow in the conical chute 70 that would increase chances of powder particles being carried along with the gas flow 148' into the outlet tube 80 and, thereby, maximize likelihood that the particle flow 146 will separate from the gas flow 148' as the gas flow 148' loses the additional kinetic energy that was imparted to it by the impeller 120. Therefore, the powder particles continue flowing downwardly along the inside surface of the conical chute 70, as indicated by flow arrows 146, and through the bottom opening 76 of the conical chute 70, as indicated by the flow arrows 150. Consequently, the powder particles fall, as indicated by flow arrows 154, into the lower chamber 92 to collect on the bottom end panel 94, as illustrated by the collected particles 156, while the gas flow 152, stripped of the powder particles 154, continues through the outlet tube 80 and out of the trap 10. While not shown, such plurality of outlet openings 83' as shown in FIG. 7 could also be included, if desired, in the swaged extension 81 of FIGS. 2 and 4, to similar advantage.

The bung hole 95 through the sidewall 57 and a bung 64 are provided to facilitate cleaning the collected particles 156 out of the lower chamber 92. A suitable cap 65, which is mountable on the bung 64, closes the bunghole 95 during operation of the trap 10. The cap can include a transparent portion 71 for use as a sight hole into the lower chamber 92 to facilitate determining when a clean-out is needed.

Figure 8:
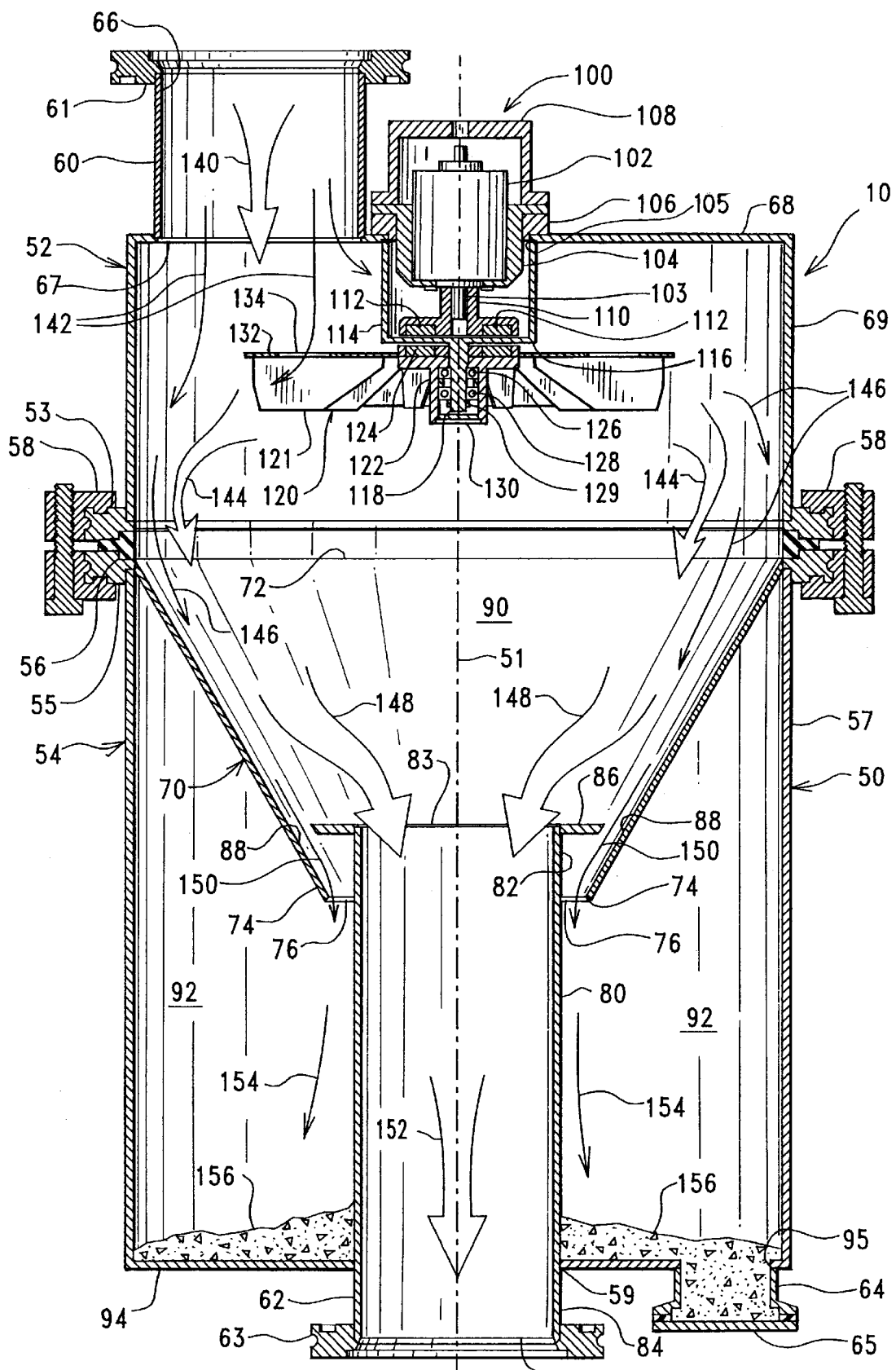
FIG. 8 is a cross-section view of another variation of the acceleration assisted particle/gas separation apparatus of this invention and shown with an outlet that is configured for operating in low mass flow rates of effluent gas from CVD systems operated at ambient atmospheric pressure.

Another example of outlet configuration that is effective in some lower mass flow rate APCVD applications is illustrated in FIG. 8. In this configuration, the outlet opening 83 is at about the same height in the conical chute 70 as the flange 86 near the bottom opening 76 of the chute 70. This height for the outlet opening 83 above the bottom opening 76 can be as low as one-sixth of the height of the conical chute 70 and still attain separation of the particle flow 150 from the gas flow 148.

While not shown in any of the FIGS. 2, 4, or 6–8 and not preferred, the outlet tube 80 does not necessarily have to extend vertically from the bottom of the trap 10 through the bottom opening 76 of the chute 70 and into the upper chamber 90. For example, instead of extending through the hole 59 in the bottom end panel 94, as shown in FIG. 3, the outlet tube 80 could have a bend somewhere under the chute 70 to extend laterally through a hole (not shown) in the cylindrical sidewall of the lower housing section 50, as long as the outlet opening 83 is in the upper chamber 90 above the bottom end 74 of the chute 70. As another example, the outlet tube 80 would not have to extend through the opening 76 at the bottom of the chute 70 at all. Instead, the outlet tube 80 could extend upwardly from its outlet opening 83 and then be routed laterally or in any other manner necessary to extend to the exterior of the housing 50, as long as the outlet opening is positioned in the upper chamber 90 above the opening 76 at the bottom of the chute 76. There could also be more than one inlet opening or more than one outlet opening within the scope of the invention described above.

As explained above, the use of a magnetically coupled impeller drive unit 100 has some advantages in the trap 10 described above for use forelines 12 of CVD systems operated at atmospheric or greater pressures, although a mechanical connection (not shown) of the motor 102 to the impeller 120 could also be used effectively in this invention. A magnetic coupling between the motor 102 positioned outside the upper chamber 90 and the impeller positioned inside the upper chamber 90 with no drive shaft or other mechanical connection extending from the motor 102 through the casing or partition 114 to the impeller 120 is even more advantageous in CVD systems that operate in vacuums. It is not unusual for such vacuum CVD systems to operate in pressures as low as $10^{-2}$ to $10^{-6}$ torr or even lower, which is very rarefied. Therefore, the magnetic coupling of the motor 102 to the impeller 120 without penetrating the partition 114 mechanically helps to maintain the integrity of the vacuum in the system while enabling the use of a spinning impeller 120 in the chamber 90 to impart additional kinetic energy to the powder particles in the trap 10, which enhances separation of the powder particles from the gas flow.

As mentioned above, the mass flow characteristics of CVD systems operating in a vacuum, especially with such low pressure ranges as $10^{-2}$ to $10^{-3}$ torr or lower are different than in higher pressure systems. In such low pressure CVD (LPCVD) systems, the density of the gas is very low, and the mean free path of the gas molecules are quite long (close to the dimension of the pump line 12). Therefore, it is difficult for the gas flow to initiate any effective cyclone-type flow inside the trap 10. This transition occurs when the system pressure is lower than 1 to 0.1 torr. Such difference in the particle physics between such lower pressure systems and higher pressure systems affect the performance of the trap 10 of this invention. Therefore, this invention includes some modifications of the trap 10 to enhance its powder particle trapping effectiveness in forelines 12 of LPCVD systems that operate in vacuums with pressures less than about 1 to 0.1 torr. Such modifications are illustrated in the modified magnetic spin trap 10' in FIGS. 9 and 10.

Figure 9:
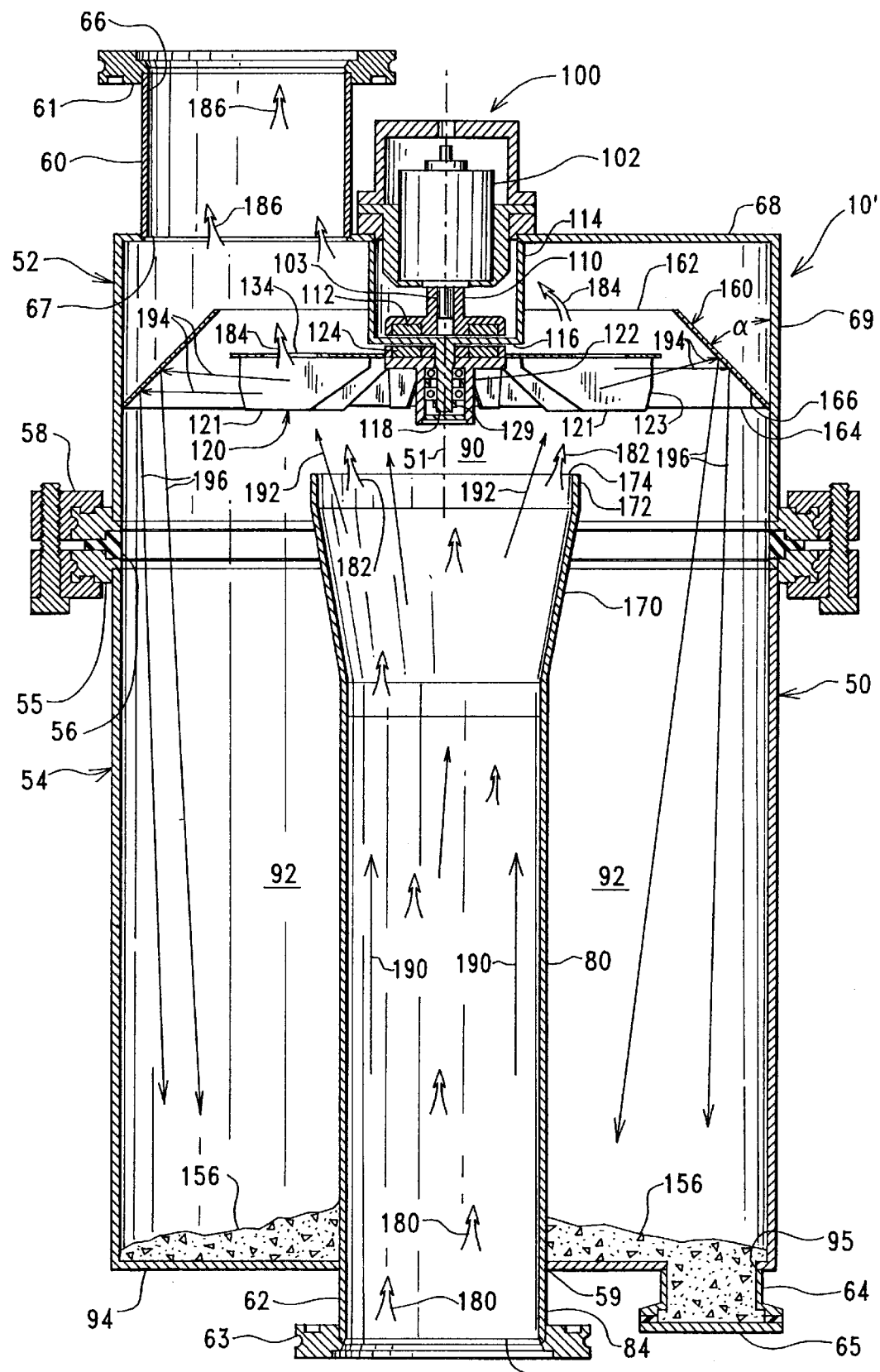
FIG. 9 is a cross-section view of another variation of the acceleration assisted particle/gas separation apparatus of this invention, which is similar to the view of FIG. 4, but showing the acceleration assisted particle/gas separation configured for use in a low pressure CVD system operated in a vacuum.
Figure 10:
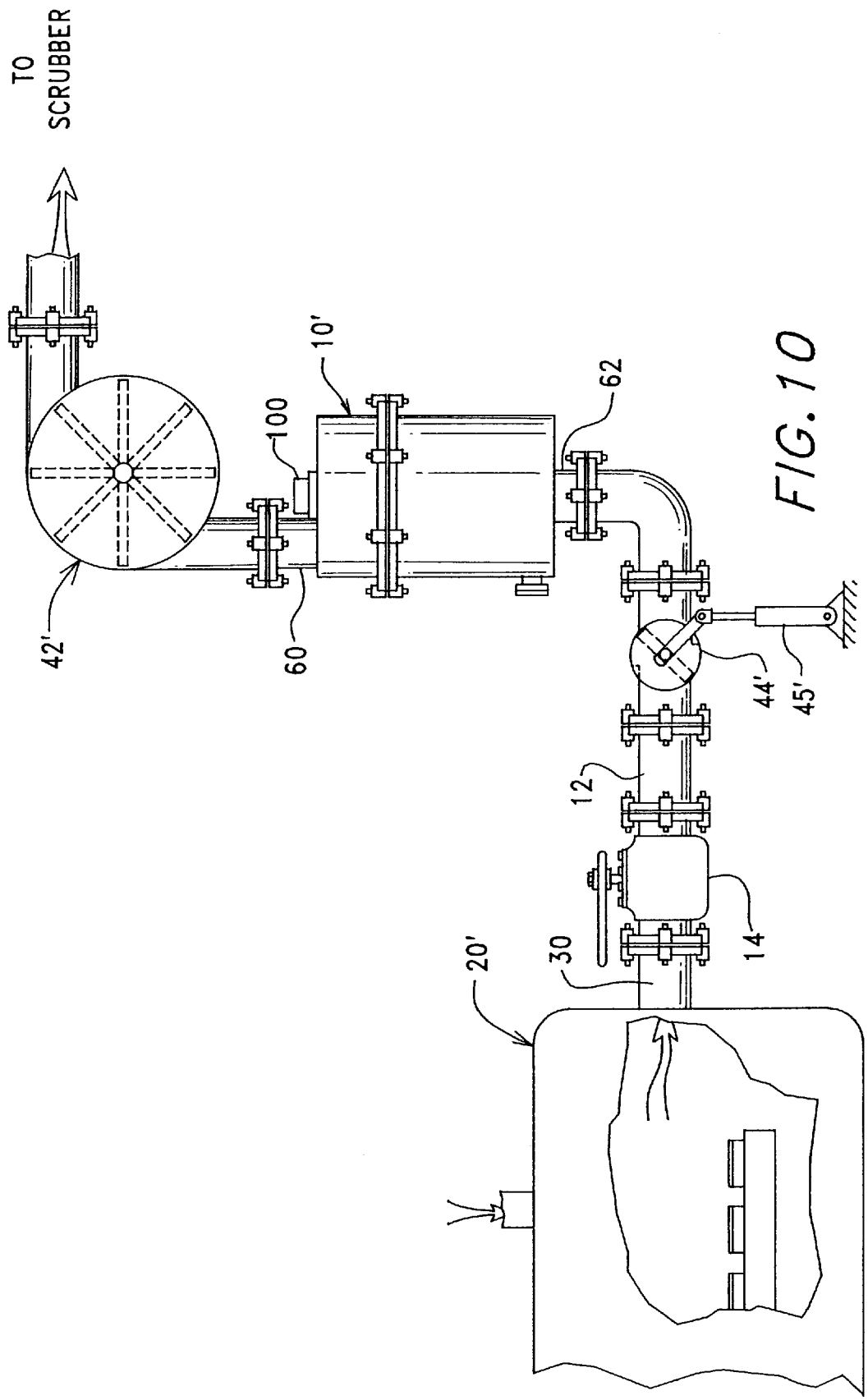
FIG. 10 is a diagrammatic view of the acceleration assisted particle/gas separation apparatus of FIG. 9 mounted in a foreline of a CVD reaction chamber deposition system and configured for vacuum operation of the CVD deposition system.

As shown in FIG. 9, the gas flow direction through the modified trap 10' is reversed from the trap 10 embodiments illustrated in FIGS. 1–8 and described above, so that the influent flow of gas 108 and powder particles 190 into the modified trap 10' is at the bottom and the effluent flow 186 of the gas is out of the top of the trap 10'. Therefore, as shown in FIG. 10, the modified trap 10' is mounted so that the foreline 12 from the LPCVD chamber 20' is connected to the tube 62 at the bottom of the trap 10', which serves as the inlet tube of the trap 10', and the tube 60 serves as the outlet tube of the trap 10'. Therefore, in this modification, the effluent flow 36 to the pump 42' is from the outlet tube 60 at the top of the trap 10'. Also, as illustrated in FIG. 6, such LPCVD systems often have an isolation valve 14 (depicted in FIG. 10 as a manual valve, but which may be automated or motor controlled) to facilitate maintaining vacuum and avoiding contamination in the LPCVD reaction chamber 20'. Also, the throttle valve 44' with its actuator 45' is preferably positioned upstream from the trap 10' in an LPCVD system, as illustrated in FIG. 10.

Referring now primarily to FIG. 9, the influent flow of gas 180 and powder particles 190 is conducted by the inlet tube 80 to the upper chamber 90 of the trap 10', where it emerges from the opening 174 at the upper 172 of the inlet tube 80 directly under the impeller 120, as indicated by gas flow arrows 182 and powder particle flow arrows 192. The blades 121 of the impeller 120 which is preferably driven via a magnetic coupling through partition 114 by an externally mounted motor 102, as described above, impart additional kinetic energy to the powder particles by accelerating them radially outward, as indicated by powder particle flow arrows 194. A cowl 160, preferably frustoconical in shape, surrounding the periphery of the impeller 120, deflects the accelerated powder particles downwardly, as indicated by the powder particle flow arrows 196, into the lower chamber 92 surrounding the inlet tube 80. In the lower chamber 92, the powder particles 156 collect on the bottom end panel 94. The upper portion 170 of the inlet tube 170 is preferably flared radially outwardly to facilitate powder particle flow 192 into the impeller 120 radially outward from the hub 122 for more efficient operation.

Meanwhile, the gas flow 182 also emerges from the opening 174 at the top 172 of the inlet tube 80 into the upper chamber 90. The gas, being drawn by the vacuum pump 42° FIG. 10, continues to flow upwardly through and out the open top 162 of the cowl 160, as indicated by gas flow arrows 184, and exits the trap 10' via the outlet tube 60, as indicated by gas flow arrows 186. The gas is so rarefied in vacuum CVD systems, as explained above, i.e., has so little density (mass per unit of volume), that any additional kinetic energy imparted to the gas flow by the impeller 120 is negligible and virtually nonexistent. Consequently, the gas flows virtually unimpeded and unaffected through the impeller 120 to the outlet tube 60. Further, the mass density of the gas flow 182, 184 through the upper chamber 90 is so low that it has little or no effect on, and does not inhibit or interfere with, the radially outward propelled trajectories 194 or the downwardly deflected paths 196 of the powder particles in the trap 10'. Therefore, the additional, outwardly directed kinetic energy of the powder particles imparted by the spinning impeller 120 effectively separates the powder particles from the gas flow in the trap 10, and the gas flow 186, stripped of the powder particles, continues out of the trap 10' via the outlet tube 60.

Since the powder particles accelerated outwardly by the impeller 120 lose some of their kinetic energy upon impact with a surface, such as the inside surface 166 of the cowl 160, most of them might eventually fall under the influence of gravity into the lower chamber 92 regardless of the shape or orientation of the impact surface, or even if there was no impact surface, positioned radially outward from the impeller 120. Therefore, the separation of the powder particles from the gas flow effected by the additional kinetic energy imparted to the powder particles by the spinning impeller 120, according to this invention, would be effective with various cowl 160 shapes and surface 166 orientations and distances from the impeller 120 or even with no cowl 160. However, when small particles impact surfaces, at least some of the particles tend to stick to, and build up on, the surface due to electrostatic charges and other influences. Enough particle build up would eventually flake off the surface and fall under the influence of gravity, but it is beneficial to get the powder particles into the lower chamber 92 as quickly and efficiently as possible. Therefore, the impact surface 166 of the cowl 160 is preferably oriented at an angle a from vertical in a range of about 30°–60°, and more preferably about 45°, to deflect the outward powder particle flow 194 downwardly into the lower chamber 92, as indicated by arrows 196. It is also preferable for the deflection surface 166 to be smooth and hard. For example, the impeller blades 121 may be made of anodized aluminum, and the cowl 160, thus the impact surface 166, may be stainless steel.

The precise size and position of the inlet opening 174 in relation to the impeller 120 is not critical, but there are some criteria that enhance functionability and efficiency of the separation of the powder particles from the gas flow in the trap. For example, as explained above, the upper portion 170 of the inlet tube 82 is flared outwardly so that the inlet opening 174 has a longer diameter so that powder particle flow 192 is directed into the impeller radially outward from the hub 122. However, the inlet opening 174 diameter should not be either so large or spaced so far away from the impeller 120 that the powder particle flow 192 can bypass the impeller 120 and flow with the gas flow 186 out of the trap 10'. Therefore, it is preferred that the distance between the inlet opening 174 and the impeller 120 is less than about one-half the diameter of the impeller 120 and that the outlet opening 174 does not extend radially outward from the axis 51 of the impeller 120 more than three-fourths of the distance between the axis 51 and the outer periphery 123 of the impeller 120.

Since these and numerous other modifications and combinations of the above-described method and embodiments will readily occur to those skilled in the art, it is not desired to limit the invention to the exact construction and process shown and described above. For example, Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features or steps, but they do not preclude the presence or addition of one or more other features, steps, or groups thereof.

The embodiments of the invention in which an exclusive property or privilege is claimed are defined as follows:

1. Spin particle trap apparatus for separating powder particles from a powder-laden stream of flowing gas, comprising:

a housing enclosing an upper chamber and a lower chamber and having an inlet opening positioned in the upper chamber for directing the stream of flowing gas out of the upper chamber without flowing through the lower chamber;

an impeller positioned in the upper chamber between the inlet opening and an outlet opening, said impeller being powered by a motor to spin and thereby impart sufficient additional kinetic energy to powder particles in the powder laden stream of flowing gas to separate the powder particles from the stream of flowing gas before the stream of flowing gas flows through the outlet opening, wherein the motor is positioned outside of the upper chamber and is magnetically coupled to the impeller in a manner that applies rotational torque of the motor to spin the impeller in the upper chamber, and with said lower chamber being positioned under and open to the upper chamber such that powder particles separated from the stream of flowing gas can fall by gravity from the upper chamber into the lower chamber; and an inverted frustoconical-shaped chute with a top end and a bottom end, the chute being positioned inside the housing below the impeller and separating the upper chamber from the lower chamber, the top end of the chute including an opening that is larger in diameter than the impeller and the bottom end of the chute including an opening that is smaller in diameter than the opening at the top end of the chute.

2. The spin particle trap apparatus of claim 1, wherein the inlet opening is above the impeller and the outlet opening is below the impeller.

3. The spin particle trap apparatus of claim 2, wherein said outlet opening is positioned between the top end of the chute and the bottom end of the chute.

4. The spin particle trap apparatus of claim 3, including an outlet tube extending downwardly from the outlet opening in the upper chamber, through the opening at the bottom of the chute and through the lower chamber to terminate outside the housing, said outlet tube being small enough in diameter to leave an annular gap in the opening at the bottom of the chute between the outlet tube and the bottom of the chute.

5. The spin particle trap apparatus of claim 4, including a flange extending radially outward from a portion of the tube that is above the opening at the bottom of the chute, said flange extending toward, but not entirely to, the chute.

6. The spin particle trap apparatus of claim 4, wherein a portion of the outlet tube that is in the upper chamber above the bottom of the chute has a plurality of outlet openings dispersed around the tube.

7. The spin particle trap apparatus of claim 4, wherein a portion of the outlet tube that is in the upper chamber above the bottom of the chute is frustoconical in shape and converges toward the outlet opening.

8. The spin particle trap apparatus of claim 1, wherein the motor is positioned outside of the upper chamber and is magnetically coupled to the impeller in a manner that applies rotational torque of the motor to spin the impeller in the upper chamber.

9. The spin particle trap apparatus of claim 1, including a rotary reactor positioned upstream from the inlet opening, said reactor including a plurality of elongated, flexible, resilient substrate bristles extending radially outward from a rotatable shaft and a stationary obstacle positioned such that the substrate bristles wipe over the obstacle as the shaft rotates.

10. The spin particle trap of claim 9, wherein the bristles have hydrophilic surfaces.

11. A rotary reactor for enhancing particle formation and agglomeration in a foreline of a CVD system, comprising a rotary reactor with a plurality of flexible substrates extending radially outward from a rotatable shaft and a wiping structure positioned such that the substrates flex backwardly as they wipe over the wiping structure and return forward to their original shape upon clearing the wiping structure as the shaft rotates.

12. The rotary reactor of claim 11, wherein the substrates have hydrophilic surfaces.

13. The rotary reactor of claim 11, wherein the substrates include elongated, flexible, resilient, bristles.

14. The rotary reactor of claim 11, wherein the substrates include elongated, flexible straps.

15. The rotary reactor of claim 11, wherein the substrates include flexible pads.

16. The rotary reactor of claim 11, wherein the wiping structure includes a stationary obstacle.

17. The rotary reactor of claim 16, wherein the stationary obstacle includes a rod.

18. The rotary reactor of claim 11, wherein the wiping structure includes a rotor positioned to interface with the flexible substrates.

19. A method of separating and trapping powder particles from a flow of powder-laden gas, comprising:
directing the flow of powder-laden gas into an upper chamber and into a spinning impeller that is positioned in the upper chamber to spin about an axis;
imparting additional kinetic energy to the powder particles in the flow of powder-laden gas with the spinning impeller in a manner that directs the powder particles with such additional kinetic energy outwardly away from the axis to enhance separation of the powder particles from the gas in the upper chamber; and
directing the powder particles with the additional kinetic energy and the flow of gas emerging from the impeller downwardly into a chute that is positioned to separate the upper chamber from the lower chamber and that has a bottom opening into the lower chamber a spaced distance below the outlet opening to allow powder particles separated from the flow of gas sans the powder particles flows out of the upper chamber via an outlet opening, while maintaining pressure of the gas flowing through the upper chamber above about 0.1 torr.

20. The method of claim 19, including directing the flow of powder-laden gas into the upper chamber via an inlet opening that is positioned above the impeller and directing the flow of gas stripped of the powder particles out of the upper chamber via the outlet opening, which is positioned below the impeller.

21. The method of claim 19, including maintaining the pressure of the gas flowing through the upper chamber at about atmospheric pressure.

22. The method of claim 19, including maintaining the pressure of the gas flowing through the upper chamber above atmospheric pressure.

23. The method of claim 19, including spinning the impeller with a motor positioned outside of the upper chamber by transmitting power from the motor to the impeller with a magnetic coupling.

24. A method of separating and trapping powder particles from a flow of powder-laden gas, comprising:
directing the flow of powder-laden gas into an upper chamber and into a spinning impeller that is positioned in the upper chamber to spin about an axis, including directing the flow of the powder-laden gas into the upper chamber via an inlet opening that is positioned below the impeller and maintaining pressure of the gas flowing in the upper chamber below about one (1) torr;
imparting kinetic energy to the powder particles in the flow of powder-laden gas with the spinning impeller in a manner that directs the powder particles with such additional kinetic energy outwardly away from the axis to enhance separation of the powder particles from the gas in the upper chamber while directing the flow of gas stripped of the powder particles out of the upper chamber via an outlet opening that is positioned above the impeller;
diminishing kinetic energy of the powder particles after imparting the additional kinetic energy from the impeller by impacting the powder particles on a surface positioned radially outward from the impeller; and
allowing the powder particles to fall from the upper chamber into a lower chamber, which is positioned under the upper chamber.

25. The method of claim 24, including impacting the powder particles on the surface with the surface slanted downwardly at an angle of at least 30 degrees from vertical to deflect the powder particles downwardly toward the lower chamber.

26. The method of claim 25, including impacting the powder particles on the surface with the surface slanted downwardly at an angle of about 45 degrees from vertical.

27. The method of claim 26, including maintaining pressure of the gas flowing through the upper chamber in a range of about $10^{-2}$ to $10^{-3}$ torr.

28. A method of separating and trapping powder particles from a flow of powder laden gas in a foreline of a CVD system operating with a pressure above about 0.1 torr, comprising:
spinning an impeller in an upper chamber which is positioned over a lower chamber;
directing the flow of powder-laden gas into the upper chamber via an inlet opening positioned above the spinning impeller and into the spinning impeller so that the spinning impeller imparts additional kinetic energy to the powder particles in the flow of powder-laden gas;
directing the flow of powder-laden gas with the additional kinetic energy imparted by the spinning impeller downwardly into a chute, which is positioned to separate the upper chamber from the lower chamber and which has an opening from the upper chamber to the lower chamber at the bottom of the chute;
directing the flow of gas to an outlet opening that is positioned in the upper chamber above the opening in the chute from the upper chamber to the lower chamber, while allowing the powder particles to flow downwardly in the chute toward the opening in the chute; and
conducting the flow of gas out of the upper chamber via the outlet opening sans the powder particles, while allowing the powder particles to flow down the chute to the opening at the bottom of the chute and into the lower chamber.

29. The method of claim 28, including spinning the impeller with power from a motor positioned outside of the upper chamber by magnetically coupling the power from the motor to the impeller.

30. A method of separating and trapping powder particles from a flow of powder-laden gas in a foreline of a CVD system operating in a vacuum with a pressure below about one (1) torr, comprising:
spinning an impeller about an axis in an upper chamber, which is positioned over a lower chamber;
directing the flow of powder-laden gas into the upper chamber via an inlet opening positioned below the spinning impeller and above the lower chamber and in a manner that directs the flow of powder-laden gas into the spinning impeller;
imparting additional kinetic energy to the powder particles in flow of powder-laden gas with the spinning impeller in a manner that propels the powder particles radially outward in relation to the spin axis, while drawing the flow of gas sans the powder particles out of the upper chamber via an outlet opening that is positioned above the impeller; and
allowing the powder particles, after being propelled radially outward by the spinning impeller, to fall into the lower chamber.

31. The method of claim 30, including diminishing kinetic energy of the powder particles after the powder particles are propelled outwardly by the spinning impeller by impacting the powder particles on a surface.

32. The method of claim 31, including deflecting the powder particles with the surface from trajectories extending radially outwardly from the impeller to paths extending downwardly into the lower chamber.

33. The method of claim 30, including spinning the impeller with power from a motor positioned outside of the upper chamber by magnetically coupling the power from the motor to the impeller.

34. A method of enhancing formation and agglomeration of particles by reaction of chemicals in effluent gases of a CVD process, comprising:
   rotating a plurality of flexible, resilient, bristles in a flow of the effluent gases and allowing reactions to form solids on surfaces of the bristles; and
   wiping the bristles against an object to dislodge particles of the solids from the surfaces.

35. Spin particle trap apparatus for separating powder particles from a powder-laden stream of flowing gas, comprising:
   a housing enclosing an upper chamber and a lower chamber and having an inlet opening positioned for directing the powder-laden stream of flowing gas into the upper chamber and an outlet opening positioned in the upper chamber for directing the stream of flowing gas out of the upper chamber without flowing through the lower chamber; and
   an impeller positioned in the upper chamber between the inlet opening and the outlet opening, said impeller being powered by a motor positioned outside the chamber and coupled magnetically to the impeller in a manner that applies rotational torque of the motor to spin the impeller and thereby impart sufficient additional kinetic energy to powder particles in the powder laden stream of flowing gas to separate the powder particles from the stream of flowing gas before the stream of flowing gas flows through the outlet opening, said lower chamber being positioned under and open to the upper chamber such that powder particles separated from the stream of flowing gas can fall by gravity from the upper chamber into the lower chamber.

36. The spin particle trap apparatus of claim 35, wherein the inlet opening is above the impeller and the outlet opening is below the impeller.

37. The spin particle trap apparatus of claim 36, including an inverted frustoconical-shaped chute with a top end and a bottom end, the chute being positioned inside the housing below the impeller and separating the upper chamber from the lower chamber, the top of the chute having an opening that is larger in diameter than the impeller and the bottom of the chute having an opening that is smaller in diameter than the opening at the top of the chute, and wherein said outlet opening is positioned between the top of the chute and the bottom of the chute.

38. The spin particle trap apparatus of claim 37, including an outlet tube extending downwardly from the outlet opening in the upper chamber, through the opening at the bottom of the chute and through the lower chamber to terminate outside the housing, said outlet tube being small enough in diameter to leave an annular gap in the opening at the bottom of the chute between the outlet tube and the bottom of the chute.

39. The spin particle trap apparatus of claim 38, including a flange extending radially outward from a portion of the tube that is above the opening at the bottom of the chute, said flange extending toward, but not entirely to, the chute.

40. The spin particle trap apparatus of claim 38, wherein a portion of the outlet tube that is in the upper chamber above the bottom of the chute has a plurality of outlet openings dispersed around the tube.

41. The spin particle trap apparatus of claim 38, wherein a portion of the outlet tube that is in the upper chamber above the bottom of the chute is frustoconical in shape and converges toward the outlet opening.

42. The spin particle trap apparatus of claim 35, wherein the inlet opening is below the impeller and the outlet opening is above the impeller.

43. The spin particle trap apparatus of claim 42, wherein the impeller has an axis of rotation, a periphery, a radius extending from the axis of rotation to the periphery, and diameter, and wherein the inlet opening is positioned an axial distance below the impeller such that the axial distance between the inlet opening and the impeller is not greater than the radius of the impeller.

44. The spin trap apparatus of claim 42, wherein the inlet opening extends no farther radially outward from the axis of rotation of the impeller than a distance equal to three-fourths of the radius of the impeller.

45. The spin trap apparatus of claim 44, including an inlet tube extending through the lower chamber toward, but not all the way to, the impeller to provide the inlet opening.

46. The spin trap apparatus of claim 45, including a deflection surface positioned radially outward from, and surrounding, the periphery of the impeller.

47. The spin trap apparatus of claim 46, including a cowl surrounding the periphery of the impeller, said cowl having an inside surface facing the impeller, and wherein the inside surface of the cowl is the deflection surface.

48. The spin trap apparatus of claim 47, wherein the cowl has a frustoconical-shape with an open bottom end and an open top end, said open bottom end being larger in diameter than the open top end.

49. The spin trap apparatus of claim 48 wherein the inside surface of the cowl is oriented at an angle from vertical in a range of about 30 to 60 degrees.

50. The spin trap apparatus of claim 49, wherein the angle is about 45 degrees.

51. The spin particle trap apparatus of claim 35, including a rotary reactor positioned upstream from the inlet opening, said reactor including a plurality of elongated, flexible, resilient substrate bristles extending radially outward from a rotatable shaft and a stationary obstacle positioned such that the substrate bristles wipe over the obstacle as the shaft rotates.

52. The spin particle trap of claim 35, wherein the bristles have hydrophilic surfaces.

53. Spin particle trap apparatus for separating powder particles from a powder-laden stream of flowing gas, comprising:
   a housing enclosing an upper chamber and a lower chamber and having an inlet opening positioned for directing the powder-laden stream of flowing gas into the upper chamber and an outlet opening positioned in the upper chamber for directing the stream of flowing gas out of the upper chamber without flowing through the lower chamber; and
   an impeller with an axis of rotation, a periphery, a radius extending from the axis of rotation to the periphery, and a diameter, said impeller being positioned in the upper chamber between the inlet opening and the outlet opening and being powered by a motor to spin and thereby impart sufficient additional kinetic energy to powder particles in the powder laden stream of flowing gas to separate the powder particles from the stream of flowing gas before the stream of flowing gas flows through the outlet opening, wherein the inlet opening is positioned an axial distance below the impeller such that the axial distance between the inlet opening and the impeller is not greater than the radius of the impeller, and wherein said lower chamber is positioned under and open to the upper chamber such that powder particles separated from the stream of flowing gas can fall by gravity from the upper chamber into the lower chamber.

54. The spin trap apparatus of claim 53, wherein the inlet opening extends no farther radially outward from the axis of rotation of the impeller than a distance equal to three-fourths of the radius of the impeller.

55. The spin trap apparatus of claim 54, including an inlet tube extending through the lower chamber toward, but not all the way to, the impeller to provide the inlet opening.

56. The spin trap apparatus of claim 55, including a deflection surface positioned radially outward from, and surrounding, the periphery of the impeller.

57. The spin trap apparatus of claim 56, including a cowl surrounding the periphery of the impeller, said cowl having an inside surface facing the impeller, and wherein the inside surface of the cowl is the deflection surface.

58. The spin trap apparatus of claim 57, wherein the cowl has a frustoconical-shape with an open bottom end and an open top end, said open bottom end being larger in diameter than the open top end.

59. The spin trap apparatus of claim 58 wherein the inside surface of the cowl is oriented at an angle from vertical in a range of about 30 to 60 degrees.

60. The spin trap apparatus of claim 59, wherein the angle is about 45 degrees.

61. Spin particle trap apparatus for separating powder particles from a powder-laden stream of flowing gas, comprising:
  a housing enclosing an upper chamber and a lower chamber and having an inlet opening positioned for directing the powder-laden stream of flowing gas into the upper chamber and an outlet opening positioned in the upper chamber for directing the stream of flowing gas out of the upper chamber without flowing through the lower chamber; and
  an impeller positioned in the upper chamber between the inlet opening and the outlet opening, said impeller being powered by a motor to spin and thereby impart sufficient additional kinetic energy to powder particles in the powder laden stream of flowing gas to separate the powder particles from the stream of flowing gas before the stream of flowing gas flows through the outlet opening, said lower chamber being positioned under and open to the upper chamber such that powder particles separated from the stream of flowing gas can fall by gravity from the upper chamber into the lower chamber; and
  a rotary reactor positioned upstream from the inlet opening, said reactor including a plurality of elongated, flexible, resilient, substrate bristles extending radially outward from a rotatable shaft and a stationary obstacle positioned such that the bristles wipe over the obstacle as the shaft rotates.

62. The spin particle trap apparatus of claim 61, wherein the inlet opening is above the impeller and the outlet opening is below the impeller.

63. The spin particle trap apparatus of claim 62, including an inverted frustoconical-shaped chute with a top end and a bottom end, the chute being positioned inside the housing below the impeller and separating the upper chamber from the lower chamber, the top of the chute having an opening that is larger in diameter than the impeller and the bottom of the chute having an opening that is smaller in diameter than the opening at the top of the chute, and wherein said outlet opening is positioned between the top of the chute and the bottom of the chute.

64. The spin particle trap apparatus of claim 63, including an outlet tube extending downwardly from the outlet opening in the upper chamber, through the opening at the bottom of the chute and through the lower chamber to terminate outside the housing, said outlet tube being small enough in diameter to leave an annular gap in the opening at the bottom of the chute between the outlet tube and the bottom of the chute.

65. The spin particle trap apparatus of claim 64, including a flange extending radially outward from a portion of the tube that is above the opening at the bottom of the chute, said flange extending toward, but not entirely to, the chute.

66. The spin particle trap apparatus of claim 64, wherein a portion of the outlet tube that is in the upper chamber above the bottom of the chute has a plurality of outlet openings dispersed around the tube.

67. The spin particle trap apparatus of claim 64, wherein a portion of the outlet tube that is in the upper chamber above the bottom of the chute is frustoconical in shape and converges toward the outlet opening.

68. The spin particle trap apparatus of claim 61, wherein the motor is positioned outside of the upper chamber and is magnetically coupled to the impeller in a manner that applies rotational torque of the motor to spin the impeller in the upper chamber.

69. The spin particle trap apparatus of claim 61, wherein the inlet opening is below the impeller and the outlet opening is above the impeller.

70. The spin particle trap apparatus of claim 69, wherein the impeller has an axis of rotation, a periphery, a radius extending from the axis of rotation to the periphery, and diameter, and wherein the inlet opening is positioned an axial distance below the impeller such that the axial distance between the inlet opening and the impeller is not greater than the radius of the impeller.

71. The spin trap apparatus of claim 70, wherein the inlet opening extends no farther radially outward from the axis of rotation of the impeller than a distance equal to three-fourths of the radius of the impeller.

72. The spin trap apparatus of claim 71, including an inlet tube extending through the lower chamber toward, but not all the way to, the impeller to provide the inlet opening.

73. The spin trap apparatus of claim 72, including a deflection surface positioned radially outward from, and surrounding, the periphery of the impeller.

74. The spin trap apparatus of claim 73, including a cowl surrounding the periphery of the impeller, said cowl having an inside surface facing the impeller, and wherein the inside surface of the cowl is the deflection surface.

75. The spin trap apparatus of claim 74, wherein the cowl has a frustoconical-shape with an open bottom end and an open top end, said open bottom end being larger in diameter than the open top end.

76. The spin trap apparatus of claim 75 wherein the inside surface of the cowl is oriented at an angle from vertical in a range of about 30 to 60 degrees.

77. The spin trap apparatus of claim 76, wherein the angle is about 45 degrees.

78. The spin particle trap of claim 61, wherein the bristles have hydrophilic surfaces.

79. A method of enhancing formation and agglomeration of particles by chemical reaction of substances in effluent gases of a deposition process for more efficient trapping and removal of such chemicals from the effluent gases, comprising:

rotating a plurality of flexible substrates in a flow of the effluent gases to adsorb and retain at least one of the substances in effluent gases on the substrates and allowing chemical reactions of the substances to form solid on the substrates; and wiping the substrates against a wiping structure that is positioned such that the substrates flex backwardly as they wipe against the wiping structure and snap forward to their original shapes upon clearing the wiping structure to dislodge the solids as particles from the substrates.

80. The method of claim 79, wherein the substrates include elongated, flexible, resilient, bristles.

81. The method of claim 79, wherein the substrates include elongated, flexible straps.

82. The method of claim 79, wherein the substrates include flexible pads.

83. The method of claim 79, wherein the wiping structure includes a stationary obstacle.

84. The method of claim 79, wherein the stationary obstacle includes a rod.

85. The method of claim 79, wherein the stationary obstacle includes a rotor positioned to interface with the flexible substrates.

86. The method of claim 79, wherein the chemical substances in the effluent gases include water and TEOS.

87. The method of claim 86, wherein the substrates have hydrophilic surfaces.

88. The method of claim 87, wherein the solids formed by the chemical reaction are TEOS polymers.

89. The method of claim 88, wherein the particles include silicon dioxide powder.

90. A method of separating and trapping powder particles from a flow of powder laden gas, comprising:

directing the flow of powder-laden gas into an upper chamber and into a spinning impeller that is positioned in the upper chamber to spin about an axis;

imparting additional kinetic energy to the powder particles in the flow of powder-laden gas with the spinning impeller in a manner that directs the powder particles with such additional kinetic energy outwardly away from the axis to enhance separation of the powder particles from the gas in the upper chamber while directing the gas to flow to an outlet opening that is positioned in the upper chamber; and allowing the powder particles to fall from the upper chamber into a lower chamber, which is positioned under the upper chamber and is remote from the flow of gas through the upper chamber to the outlet opening, while the gas flows out of the upper chamber via the outlet opening.

* * * * *